C. H. LIGHT.
TIRE PROTECTOR AND ANTISKID DEVICE.
APPLICATION FILED FEB. 7, 1917.
1,277,226. Patented Aug. 27, 1918.
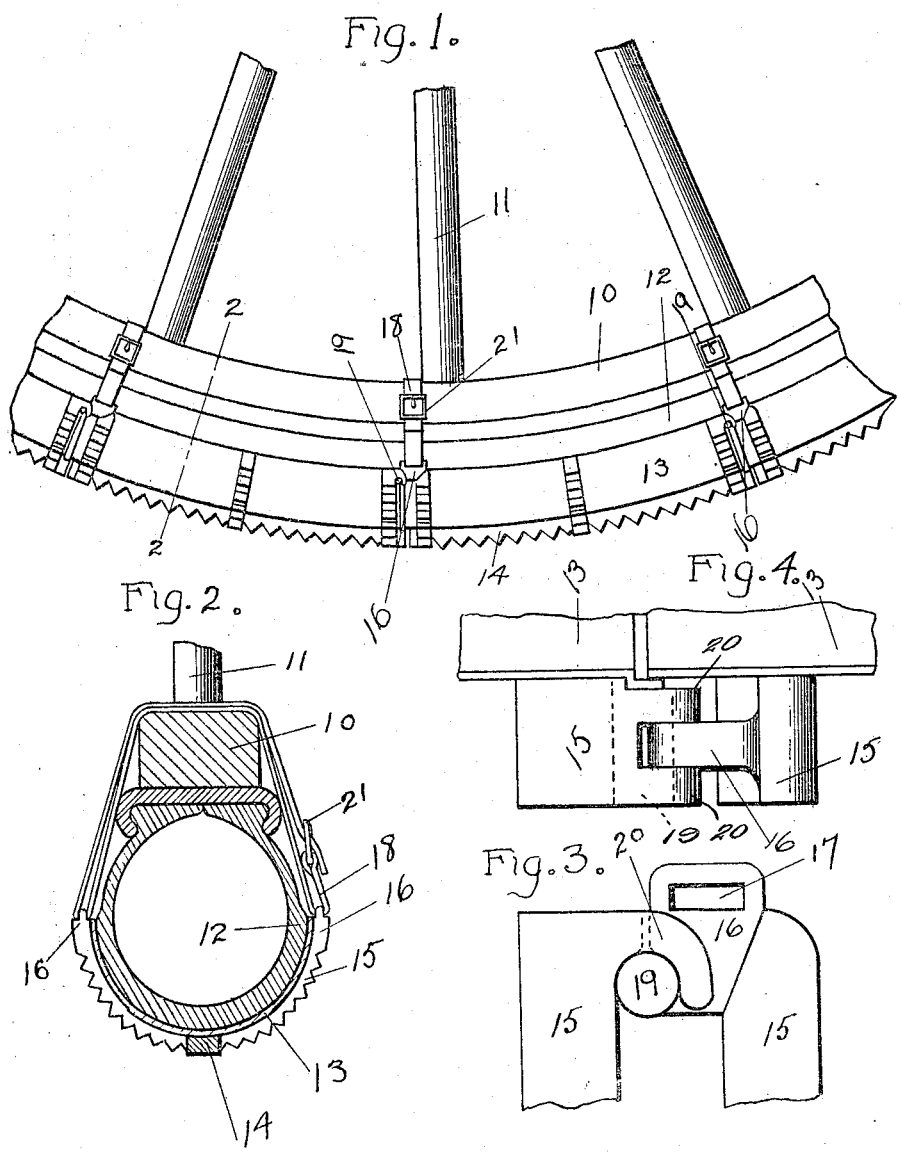

UNITED STATES PATENT OFFICE.

CLAUS H. LIGHT, OF DES MOINES, IOWA, ASSIGNOR OF ONE-HALF TO EVA SPARLING, OF GARDEN GROVE, IOWA.

TIRE-PROTECTOR AND ANTISKID DEVICE.

1,277,226. Specification of Letters Patent. Patented Aug. 27, 1918.

Application filed February 7, 1917. Serial No. 147,239.

*To all whom it may concern:*

Be it known that I, CLAUS H. LIGHT, of Des Moines, in the county of Polk and State of Iowa, have invented a certain new and useful Tire-Protector and Antiskid Device, of which the following is a specification.

The object of my invention is to provide a tire protector and anti-skid device, adapted to protect the casing of a pneumatic tire and reduce the possibility of skidding to a minimum.

A further object is to provide such a device comprising a plurality of sections arranged around the tread portion of a tire, said sections having longitudinally arranged central reinforcing portions adapted to prevent skidding, and also having reinforcing anti-skidding means arranged circumferentially of the tire.

A further object is to provide such a device in which the sections are provided with reinforcing members arranged adjacent to the ends of the sections, reinforcing portions are provided having interlocking parts for connecting the sections around the tire.

A further object is to provide such a device in which one of the reinforcing members on each section is provided with means for securing the section on the wheel.

My invention consists in the construction, arrangement and combination of the various parts of the device, whereby the objects contemplated are attained as hereinafter more fully set forth, pointed out in my claim, and illustrated in the accompanying drawings, in which:

Figure 1 shows a side elevation of a portion of a vehicle wheel equipped with a pneumatic tire having installed thereon, a tire protector, and anti-skid device, embodying my invention.

Fig. 2 shows a transverse, sectional view taken on the line 2—2 of Fig. 1.

Fig. 3 shows an enlarged detail view of the interlocking member formed at the ends of two adjacent sections, and Fig. 4 shows an enlarged, detail view of the parts shown in Fig. 3, looking outwardly from the hub of the wheel.

In the accompanying drawings, I have used the reference numeral 10 to indicate generally the felly of a vehicle wheel from which the spokes 11 extend inwardly.

Mounted on the wheel is an ordinary pneumatic tire 12.

My improved tire protector and anti-skid device comprises a plurality of sections 13, each comprising a sheet of metal having the form of an inwardly opening channel, and also curved from end to end to conform to the circumferential curve of the tire.

Each section is provided on its outer surface with a central reinforcing rib or member 14, preferably corrugated, as shown in Fig. 1.

Each section is also provided with a plurality of reinforcing ribs or members 15 arranged to extend across the tire, as shown in Figs. 1 and 2, and preferably corrugated or roughened, as shown.

The reinforcing member 15, at one end of each section, is provided with a plate or portion 16, extending inwardly radially of the wheel, and having at its inner end a slot 17 to receive a strap or the like 18.

The portions 16 of each member 15 also project away from the members 15 circumferentially of the wheel, as shown in Fig. 3, and are provided with pins 19 projecting laterally in both directions from the members 16.

At the opposite end of each section, the member 15 is provided at each end of each side of the tire with a pair of spaced hook members 20 projecting circumferentially of the wheel from the member 15 to which they are secured.

The hook members 20 are designed to receive between them an adjacent member 16, and each hook member 20 receives one end of a pin 19, as shown in Figs. 3 and 4.

It will be seen that the construction of the interlocking parts, just described, is such as to permit proper play of the sections on the tire.

The straps 18 are provided with buckles 21 and are extended around the felly of the wheel.

It will be seen that the sections of my tire protector and anti-skid device cover only the tread portion of the tire and thoroughly protect it from pounding and saving it from wear on the surface over which the tire travels.

The members 14 and 15 form anti-skid devices which prevent the sliding of the wheel on the ground in either direction in which the vehicle is traveling.

Some changes may be made in the construction and arrangement of the parts of my improved device without departing from the essential features and purposes thereof, and it is the intention to cover by the patent to be issued on my application any such modifications of structure, or use of mechanical equivalents which may be reasonably included within the scope of my claim.

I claim as my invention:

In an anti-skid device, a plurality of anti-skidding sections adapted to fit the central tread portion of a pneumatic tire and arranged in succession around the tire; means for pivotally connecting the sections successively together, comprising a member on each side of each section at one end of each section, projecting circumferentially alongside the tire, provided with oppositely extending cylindrical pins, and a pair of spaced hook members on each side of the opposite end of each section, adapted to receive the pins of an adjacent section and to be spaced on opposite sides of the circumferentially extending portion of an adjacent section; and means for securing one end of each section on the rim of a wheel.

Des Moines, Iowa, December 23, 1916.

CLAUS H. LIGHT.

Copies of this patent may be obtained for five cents each, by addressing the "Commissioner of Patents, Washington, D. C."